(12) United States Patent  (10) Patent No.: US 8,504,224 B2
Marty et al.  (45) Date of Patent: Aug. 6, 2013

(54) METHOD OF MONITORING ATMOSPHERIC AREAS FOR AN AIRCRAFT

(75) Inventors: Nicolas Marty, Saint Sauveur (FR); Hugues Meunier, Frouzins (FR); Philippe Salmon, Colomiers (FR)

(73) Assignee: Thales, Neuilly sur Seine (FR)

( * ) Notice: Subject to any disclaimer, the term of this patent is extended or adjusted under 35 U.S.C. 154(b) by 254 days.

(21) Appl. No.: 12/544,926

(22) Filed: Aug. 20, 2009

(65) Prior Publication Data
US 2010/0057276 A1  Mar. 4, 2010

(51) Int. Cl.
G06F 7/00 (2006.01)
(52) U.S. Cl.
USPC .............................. 701/14; 340/964
(58) Field of Classification Search
USPC ....................... 701/9, 14; 340/964
See application file for complete search history.

(56) References Cited

U.S. PATENT DOCUMENTS

| 6,088,654 | A * | 7/2000 | Lepere et al. | 701/301 |
|---|---|---|---|---|
| 6,317,663 | B1 | 11/2001 | Meunier et al. | |
| 6,480,120 | B1 * | 11/2002 | Meunier | 340/970 |
| 6,667,710 | B2 * | 12/2003 | Cornell et al. | 342/26 R |
| 6,865,452 | B2 * | 3/2005 | Burdon | 701/3 |
| 7,120,540 | B2 | 10/2006 | Meunier | |
| 7,321,813 | B2 | 1/2008 | Meunier | |
| 7,433,781 | B2 | 10/2008 | Bitar et al. | |
| 7,493,197 | B2 | 2/2009 | Bitar et al. | |
| 7,872,594 | B1 * | 1/2011 | Vesel | 340/970 |
| 2003/0107499 | A1 | 6/2003 | Lepere et al. | |
| 2004/0044445 | A1 | 3/2004 | Burdon | |
| 2004/0239550 | A1 | 12/2004 | Daly | |
| 2007/0031007 | A1 | 2/2007 | Bitar | |
| 2007/0050101 | A1 | 3/2007 | Sacle et al. | |
| 2007/0162197 | A1 * | 7/2007 | Fleming | 701/10 |
| 2007/0185652 | A1 | 8/2007 | Salmon et al. | |
| 2007/0187554 | A1 | 8/2007 | Bitar et al. | |
| 2007/0219705 | A1 | 9/2007 | Bitar et al. | |

(Continued)

FOREIGN PATENT DOCUMENTS

| WO | WO 2003/008997 A | 1/2003 |
|---|---|---|
| WO | WO 2005/069093 A | 7/2005 |
| WO | WO 2007/054448 A | 5/2007 |

OTHER PUBLICATIONS

U.S. Appl. No. 12/440,513, filed Aug. 229, 2007.
U.S. Appl. No. 12/479,957, filed Jun. 8, 2009.
U.S. Appl. No. 12/478,367, filed Jun. 4, 2009.
U.S. Appl. No. 12/487,919, filed Jun. 19, 2009, Laurent Flotte, et al.

*Primary Examiner* — Thomas Black
*Assistant Examiner* — Shardul Patel
(74) *Attorney, Agent, or Firm* — LaRiviere, Grubman & Payne, LLP

(57) ABSTRACT

The invention relates to a method and a device for monitoring risky atmospheric areas.

The invention relates to an onboard device connected to meteorological measurement systems making it possible to calculate danger detection areas in front of the aircraft in order to detect potential areas of penetration of the aircraft into risky atmospheric areas.

The areas of intersection between the detection areas and the risky meteorological areas are calculated according to the trajectory of the aircraft stored in the navigation system.

The method makes it possible to generate alerts and force the display of the meteorological situation in front of the aircraft in case of danger.

12 Claims, 4 Drawing Sheets

U.S. PATENT DOCUMENTS

| | | |
|---|---|---|
| 2007/0250223 A1 | 10/2007 | Francois et al. |
| 2007/0265776 A1 | 11/2007 | Meunier et al. |
| 2007/0276553 A1 | 11/2007 | Bitar et al. |
| 2008/0046171 A1 | 2/2008 | Bitar et al. |
| 2008/0174454 A1 | 7/2008 | Bitar et al. |
| 2008/0306680 A1 | 12/2008 | Marty et al. |
| 2009/0132103 A1 | 5/2009 | Marty et al. |
| 2009/0157241 A1 | 6/2009 | Meunier et al. |
| 2010/0082209 A1* | 4/2010 | Yoshioka et al. ............... 701/62 |

* cited by examiner

METHOD OF MONITORING ATMOSPHERIC AREAS FOR AN AIRCRAFT

PRIORITY CLAIM

This application claims priority to French Patent Application Number 08 04811, entitled Method of Monitoring Atmospheric Areas for an Aircraft, filed on Sep. 2, 2008.

FIELD OF THE INVENTION

The field of the invention relates to systems for monitoring atmospheric areas that present a risk to aircraft. The invention relates particularly to systems making it possible to generate alerts relating to the weather situation in front of the aircraft.

BACKGROUND OF THE INVENTION

The current systems use meteorological radars to detect the meteorological situation in front of the aircraft and make it possible to display it on the onboard screens. This information is supplied to the crew by a palette of colours, typically green, yellow and red for storms and light or dark magenta for turbulences, but no alert is associated with these colour levels. Thus, if the pilot has not selected the display on at least one of his onboard screens, he may fly his airplane in complete ignorance into a cloudy or turbulent mass with no warning. At the present time, it is up to the crew to select the display of the weather situation if this does not appear to present a risk. The term storms meaning to select areas relating to areas of rain, hail, strong ascent and descent.

The U.S. Pat. No. 6,865,452 describes a monitoring system that makes it possible to force the weather display based on an estimated future position of the airplane and a level of risk. The meteorological areas that present a risk are defined by geographic points in a database. This system compares the scheduled route in the navigation system with the location of the areas presenting a risk that are detected. If the aircraft does not travel precisely over the points of the meteorological areas, risky situations may not be detected. The atmospheric areas that present a risk do not have exact limits.

The U.S. Pat. No. 6,667,710 describes a meteorological radar system capable of supplying systems of the aircraft with a three-dimensional representation of the meteorological situation in front of the aircraft.

The aim of the invention is to propose a system that makes it possible to generate alerts to the pilot if there is a risk of his craft penetrating into an atmospheric area that is dangerous in terms of storms and turbulences and force the display of this atmospheric situation if the latter was not selected.

SUMMARY OF THE INVENTION

More specifically, the invention relates to a method for a system for monitoring atmospheric areas presenting a risk for aircraft, the system being connected to a navigation system storing the trajectory of the aircraft, to a meteorological system, to alarm generation systems and to viewing devices, characterized in that the method performs the following steps:
  calculation of atmospheric areas detected by the meteorological system, the atmospheric areas being defined by level of risk,
  calculation of at least one danger detection area in front of the aircraft defining an alert level, this area being positioned on the current position of the aircraft, having a horizontal width widening laterally to the trajectory of the aircraft as intended in front of the aircraft and having a slope that varies dynamically in a manner similar to the current slope of the trajectory of the aircraft,
  generation of alarms defining a level of risk and alert for the areas of intersection between the atmospheric areas and the danger detection area,
  display of the intersection areas on all or part of the screen of at least one viewing device when an alarm is generated.

Advantageously, the meteorological system calculates the atmospheric areas in a three-dimensional space.

Advantageously, the danger detection area is a volume whose vertical thickness is approximately 300 m centred on the position of the aircraft.

Advantageously, the method calculates two detection areas positioned on the predicted trajectory of the aircraft, the first area beginning at the current position of the aircraft for a high alert level and the second area being positioned as intended of the trajectory defining a lower alert level.

Advantageously, a danger detection area has an aperture angle, and within this angle the detection distance is constant.

Advantageously, the danger detection area is of trapezoidal shape, the lateral apertures having an angle of approximately 1.5° relative to the heading of the aircraft at the start of the detection area.

Advantageously, when the instantaneous flight trajectory of the aircraft includes a turn, the lateral aperture on the side of the turn widens proportionally and dynamically to the rate of turn.

Advantageously, the lateral aperture on the side opposite the turn diminishes proportionally and dynamically to the rate of turn.

Advantageously, the danger detection area has a sufficient length in front of the aircraft enabling the aircraft to perform a half-turn.

Advantageously, the danger detection area has an aperture angle, and inside this angle the detection distance is variable between a minimum value and a maximum value.

Advantageously, the detection distance varies symmetrically relative to the heading of the aircraft.

The method calculates the areas of intersection with these atmospheric areas and the probable areas of displacement of the aircraft for the generation of alerts regarding the atmospheric areas. The atmospheric areas presenting a risk are areas of air where the pressure and currents may disrupt the trajectory of the aircraft.

The monitoring system is based on the GCAS calculation principles of the collision-prevention systems, notably of TAWS type, for determining the risk of penetration into the atmospheric areas that present a risk and for generating the relevant alerts. The inventive method makes it possible to force the display of a view by displaying the atmospheric area indicated from the areas that present a risk in front of the aircraft while supplying an audible alert. The crew is not then disturbed by untimely display switchovers without warning.

BRIEF DESCRIPTION OF THE DRAWINGS

The invention will be better understood and other benefits will become apparent from reading the description that follows, given by way of nonlimiting example, and thanks to the appended figures in which.

DETAILED DESCRIPTION OF PREFERRED EMBODIMENT

Figure 1:
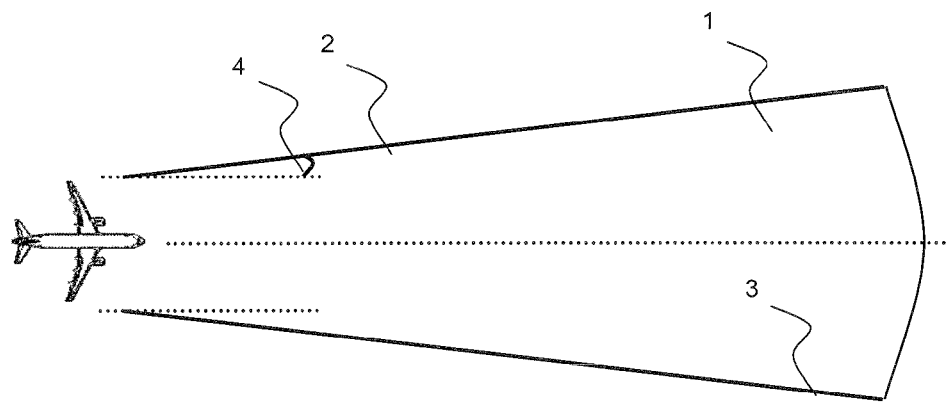
FIG. 1 represents a shape of a detection area in front of the aircraft, this shape is similar to a trapezium.

The monitoring of the atmospheric areas that present a risk using the inventive monitoring method makes it possible to generate alerts and display the atmospheric situation in front of the aircraft. The areas with atmospheric risk are processed according to the same principle as the obstacle collision-prevention systems. However, the margins considered for calculating detection areas can be reduced compared to those calculated in the TAWS systems in order to avoid false alerts. In practice, the edge areas of the atmospheric areas can be approached without any major risk unlike terrain-type obstacles which result in the loss of the aircraft in the event of impact, however weak.

The method is implemented by the monitoring device connected to a navigation system 42 storing the trajectory of the aircraft, to a meteorological system 41, to alarm generation systems 44 and 45 and to viewing devices.

In a first embodiment, the method and device according to the invention provide monitoring of the atmospheric area in a three-dimensional space.

In a second embodiment, the method and device according to the invention provide monitoring of the atmospheric area in a two-dimensional space.

The atmospheric situation is acquired by meteorological systems, typically by the meteorological radar on board the aircraft. However, the latter can alternatively be supplied by ground systems and transmitted to the aeroplane by datalink. The information from the onboard meteorological radar in the aircraft is then complemented with information originating from the ground systems. The atmospheric situation is determined by different levels of risk that are linked to levels of reflectivity of the radar emissions on the cloud masses, the dangerousness being proportional to the level of reflectivity. It can also depend on geographic, seasonal or hydrometeor type variations.

The levels of risk of the atmospheric situation are also linked to the velocity levels of the hydrometeors measured by the radar emissions, the dangerousness being proportional to the intensity of the velocities. The levels of dangerousness of the atmospheric situation can also be translated into levels of stresses on the aeroplane based on velocity levels.

Hydrometeor type variations comprise describing the type(s) of hydrometeors pertaining atmospheric situation. Hydrometeor velocity levels comprise data describing the velocities of hydrometeors pertaining to the atmospheric situation.

An alert is generated when a predetermined minimum level of dangerousness of the meteorological situation enters into a detection area. Preferably, a "yellow area" or "light magenta area" generates a caution-type alarm. This alert level informs the crew so that it can consider a change of trajectory. A "red" or "dark magenta" area generates a warning-type alert. This alert level informs the crew so that it can make a change of trajectory without delay. The alarms may be oral and/or visual on one or more light indicators and/or on one or more views.

In the first embodiment, the meteorological system calculates atmospheric areas in a three-dimensional space. The situation is determined in three dimensions according to various formats.

In a first format, the situation is described in the form of a volume in a reference frame by absolute coordinates, by x, y and z divided into cells of equal volume. Each cell describes the meteorological situation in the space assigned to the same cell.

In a second format, the cells are referenced in a reference space relative to the position of the aircraft. The cell is defined by an angular segment defined by azimuth, elevation and distance.

In a third format, the different meteorological phenomena are defined in the form of objects or individual structures characterized by a specific severity level. A first object can contain a second object with a higher level of dangerousness. This data format describes the meteorological phenomena in a more realistic manner. Typically, a first large volume will be characterized by a low level of dangerousness. A second smaller volume located at the centre of the large volume will be characterized by a higher level of dangerousness. An aircraft penetrating into an atmospheric area presenting a risk initially meets an area presenting a low risk and as it penetrates more into the atmospheric area, the more risky the situation becomes. This format is representative of storm areas where the contours present a less high risk. The calculation system processes the meteorological situation data according to any one of the above formats.

In the second embodiment, the monitoring device processes the meteorological situation information stored in the database in a two-dimensional data format. Preferably, in radial form in a reference frame relative to the position of the aircraft or even in the form of a cell with x and y coordinates in an absolute reference frame.

In the case where the meteorological system supplies the data in a three-dimensional format, the monitoring device can also process the information relating to the meteorological data in one of the three-dimensional formats and display the situation on the onboard screens in two dimensions.

When the areas of intersection between the detection area and the atmospheric areas that present a risk are detected, oral and/or visual alerts are generated. Advantageously, all or part of the screen of a display device shows the atmospheric situation when alerts are generated. The crew does not demand the display of the meteorological situation at each instant in the flight and consequently, it may be that the crew deactivates the display of the meteorological situation in the navigation view. This is why, when a situation that presents a risk occurs, the display of the weather situation is forced at the same time as alerts are generated.

A key characteristic of the invention is to determine a detection area in front of the aircraft that makes it possible to cover the probable locations of the aircraft around its provisional trajectory. The provisional trajectory is defined in the aircraft's navigation system, commonly called FMS which stands for "Flight Management System". The use of a detection surface area makes it possible to detect the relevant alerts unlike systems that calculate points of interaction between the points of the trajectory and the points of risky atmospheric areas. The aircraft may in fact not travel exactly along the planned trajectory and, in this case, the alert is not lifted if the predefined trajectory follows an area presenting a risk without showing points of interaction.

The detection areas determined by the monitoring method are such that they include flight margins or that they enable the aircraft to perform a flight manoeuvre making it possible to avoid the meteorological area presenting a risk. The various detection area calculation modes that are described hereinbelow by way of example are defined, initially, in the way of implementing the method for a two-dimensional space. These detection shapes are also valid for the way of implementating a three-dimensional space, the detection areas described by FIGS. 1 to 6 then showing the horizontal projections of the detection volumes that can be calculated.

FIG. 1 is a nonlimiting example representing a danger detection area as calculated by the method. A danger detection area has an aperture angle, inside which the detection distance is constant. In a first calculation mode, the danger detection area 1 is trapezoidal in shape, the lateral apertures 2 and 3 having an angle 4 of approximately 1.5° relative to the heading of the aircraft at the start of the detection area. The detection area widens laterally to the trajectory of the aircraft as it moves away in front of the aircraft in order to take account of the possible heading variations and, consequently, the potential future locations of the aircraft. Preferably, the width of the detection area at the current position of the aircraft is a hundred or so metres. It can also depend on the instantaneous navigation accuracy as defined by the onboard equipment. This accuracy data corresponds to the ANP (Actual Navigation Performance) or EPE (Estimated Position Error) data from the FMS.

Figure 2:
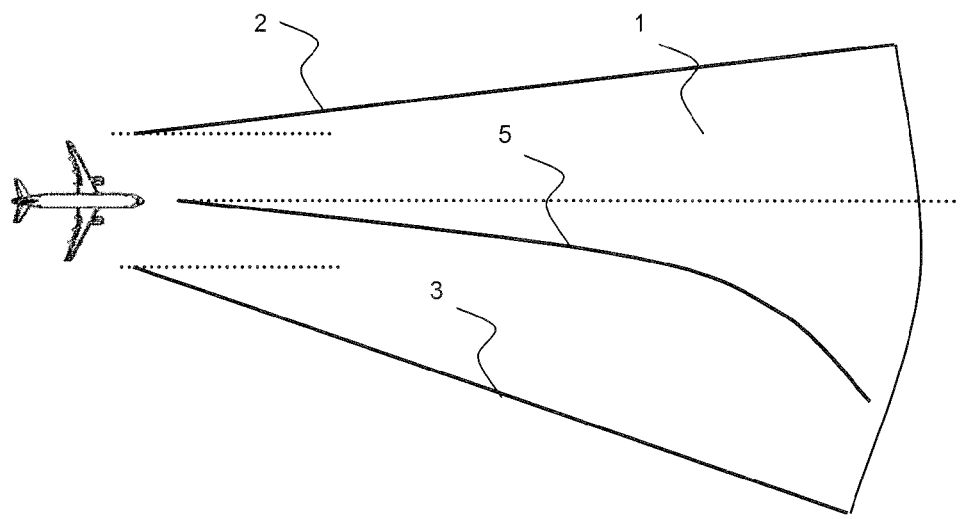
FIG. 2 represents the shape of a detection area in front of the aircraft whose lateral limits are dissymmetrical to take account of the change of heading of the trajectory.

FIG. 2 represents a second method of calculating the detection area. The trajectory being studied includes a turn component 5 in front of the aircraft. In this second calculation method, when the instantaneous flight trajectory of the aircraft includes a turn, the lateral aperture 3 on the side of the turn widens proportionally and dynamically to the rate of turn. The angle of the lateral limit of the detection area can be increased up to 90 degrees on the side of the turn depending on the rate of turn. On the side opposite the turn, the angle of the lateral limit 2 is maintained if an avoidance above is considered.

Figure 3A:
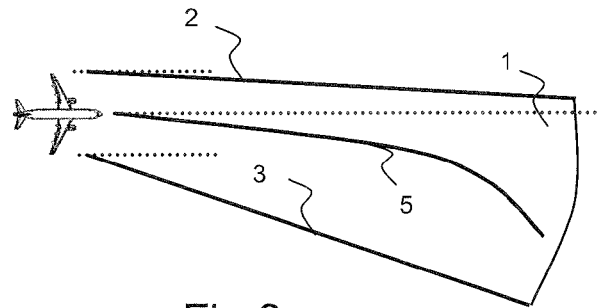
FIG. 3a represents a detection area shape. The two lateral limits are inclined according to the rate of turn.
Figure 3B:
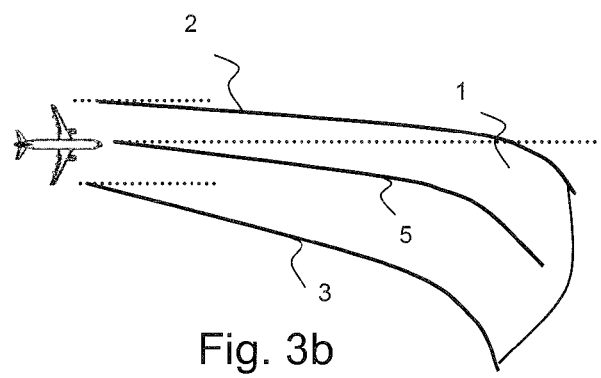
FIG. 3b represents a danger detection area shape whose two lateral limits are inclined by one and the same proportion according to the rate of turn.

In a third method of calculating the detection surface area, the lateral aperture on the side opposite the turn diminishes proportionally and dynamically to the rate of turn. FIGS. 3a and 3b describe this detection area shape. As represented by FIG. 3a, the angle on the side opposite the turn is preferably reduced by 2.5 degrees proportionally to the increase in the angle on the side of the turn. FIG. 3b describes a detection area shape 1 whose lateral limits hug the shape of the trajectory of the aircraft.

Figure 4A:
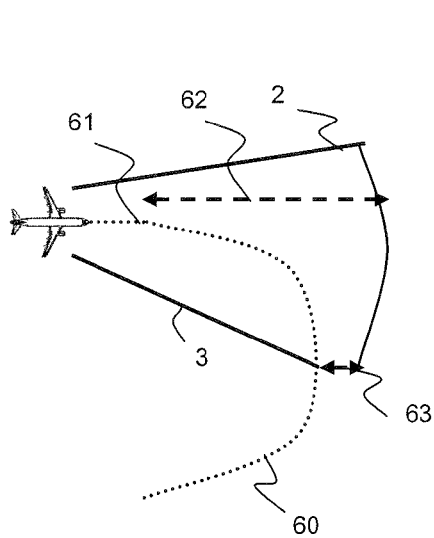
FIG. 4a represents a detection area shape enabling the aircraft to follow a half-turn avoidance trajectory in a lateral direction.

In a fourth method of calculating the detection area, described by FIG. 4a, the danger detection area includes a sufficient length in front of the aircraft making it possible for the aircraft to perform a half-turn. The length in front of the aircraft consists of a sum of two distances: a first distance 61 enabling the aircraft to continue its flight without changing trajectory for a duration equal to a response time, preferably approximately 5 seconds, and a second distance 62 enabling a turn 60 to be executed with a standard rate of roll, typically 3° per second and a lateral margin 63. This detection area shape is calculated so that the aircraft can follow a trajectory to avoid an atmospheric area that presents a risk by a half-turn manoeuvre 60.

Figure 4B:
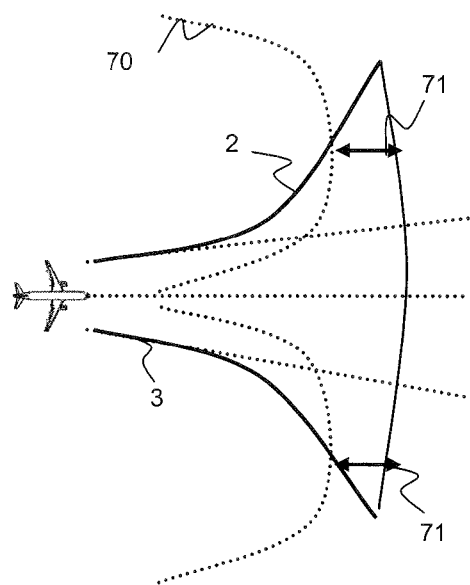
FIG. 4b represents a funnel-shaped detection area enabling the aircraft to follow a half-turn avoidance trajectory whatever the lateral direction.

In a fifth calculation method, illustrated by FIG. 4b, the danger detection area is in the shape of a funnel. As it moves away in front of the aircraft, the detection area presents outwardly-curved lateral limits 2 and 3. The distance in front of the aircraft includes a margin 71 relative to the half-turn trajectories 70.

The danger detection area has an aperture angle, inside which the detection distance varies between a maximum value and a minimum value. Preferably, the detection distance varies symmetrically relative to the heading of the aircraft.

Figure 5:
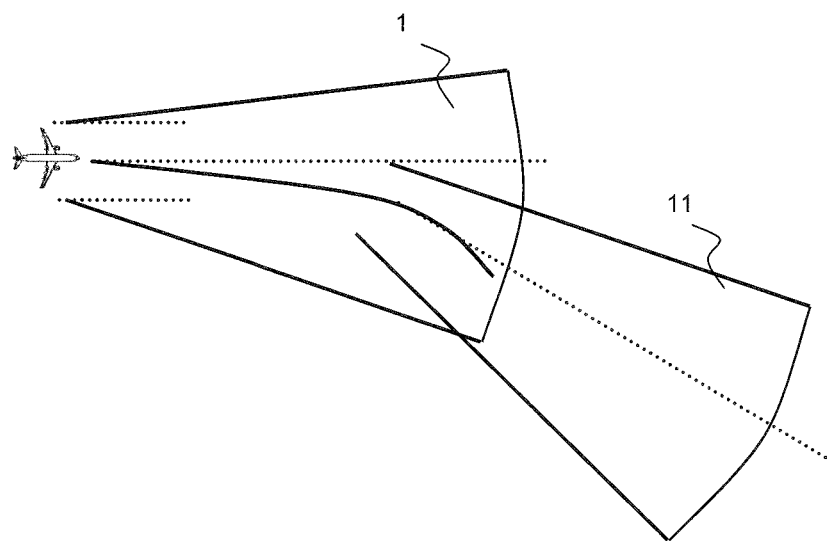
FIG. 5 represents a detection area shape making it possible to avoid false alerts. This detection area shape has bevelled angles at the end of the area opposite the aircraft.

FIG. 5 illustrates a sixth method of calculating a detection area that resembles the shape of a drop of water or an ice-cream cone. At the lateral limits 3 and 2 of the aperture angle, the detection distance is shorter than those located in the vicinity of the heading of the aircraft. At the end of the detection area, the lateral portion 10 is rounded. This curved shape makes it possible to avoid triggering false alerts.

Figure 6:
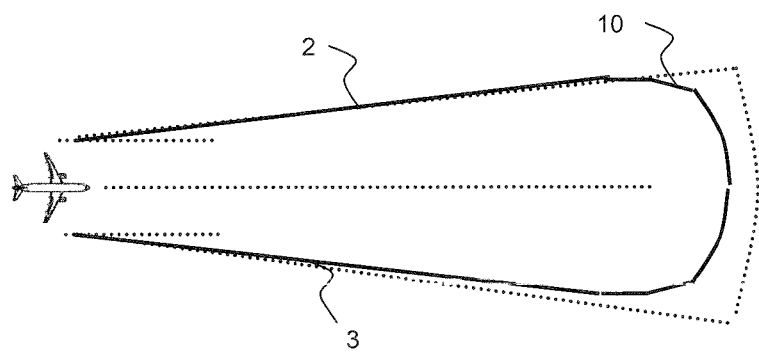
FIG. 6 represents two detection areas each with a respective alert level, a first caution-type alert level and a second warning-type alert level.

In a seventh calculation method, illustrated by FIG. 6, the method calculates two detection areas 1 and 11 positioned on the predicted trajectory of the aircraft, the first area 1 starting at the current position of the aircraft for a high alert level and the second area being positioned forward of the trajectory defining a lower alert level 2.

The monitoring device includes means of generating caution and warning type alerts to signal atmospheric areas that present a risk, the caution-type alerts being detected when an atmospheric area that presents a risk penetrates into the detection area 11 and the warning-type alerts being detected when an atmospheric area that presents a risk penetrates into the detection area 1. Preferably, the two feelers are separated timewise by a value of approximately 30 seconds and positioned by taking into account the trajectory stored in the navigation system and the rate of turn.

Figure 7:
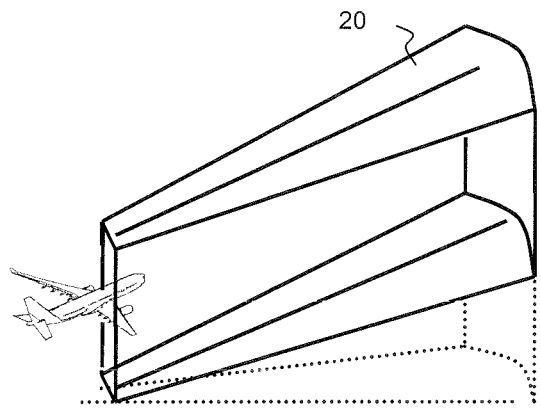
FIG. 7 represents a volume-type detection area in front of the aircraft that takes account of the slope of the trajectory.
Figure 8:
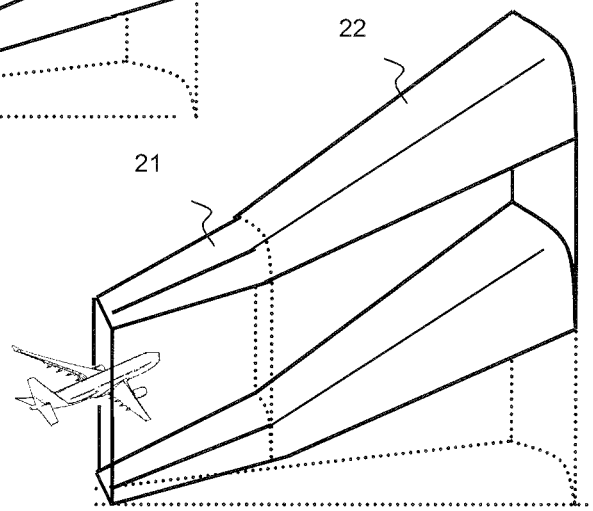
FIG. 8 represents a volume-type detection area calculated so that the aircraft can follow an avoidance trajectory above the atmospheric area that presents a risk.

For the implementation of the monitoring method in a three-dimensional space, volume detection areas are calculated, the horizontal projections of these volumes possibly being identical to the detection areas described previously by FIGS. 1 to 6. FIGS. 7 and 8 describe volume detection areas.

In a first method of calculating a volume detection area, the detection area 20 is a volume whose vertical thickness is approximately 300 m centred on the position of the aircraft.

The slope of the detection area varies dynamically in a manner similar to the current slope of the trajectory of the aircraft. By way of example, when the aircraft has a climb trajectory, the detection area has a volume whose slope also climbs in a manner similar to the trajectory of the aircraft. When the aircraft has a descent trajectory, the detection area has a volume whose slope also descends in a manner similar to the trajectory of the aircraft. These slope parameters of the aircraft are supplied by systems of inertial unit type.

When an avoidance mode is an avoidance above an area presenting a risk, the detection area consists of a volume 21 with a fracture in front of the aircraft. FIG. 8 shows the calculated detection volume. A second portion 22 of the detection volume then has a greater slope than the portion 21 of the detection volume. The slope of the detection volume depends on the climb capabilities of the aircraft. The climb capability data is supplied by the performance databases and calculated according to the configuration of the aircraft, stored in the FMS system, and data relating to the external environment.

According to the same principle as that described in the two-dimensional as intended, the method can also calculate two detection volumes in front of the aircraft having different alert levels, a first "caution" type level and a second "warning" type level.

Figure 9:
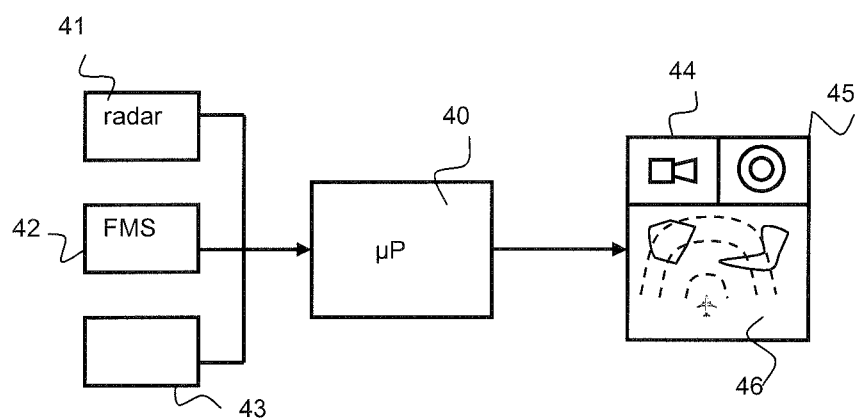
FIG. 9 is a diagram representing the monitoring device.

The monitoring system 40, represented by FIG. 9, is connected to a navigation system 42 storing the trajectory of the aircraft, to a meteorological system 41, to audible 44 and/or visual 45 alarm generation systems and to viewing devices. The system also receives the flight parameters from sensors 43 such as the inertial unit to calculate the shape of the detection areas. In case of an alarm, the display of the meteorological situation 46 is forced on the view.

The invention applies to monitoring of the atmospheric areas in front of the aircraft. The monitoring system can also be coupled with an aircraft's terrain avoidance system. Preferably, the alerts have a symbology and a human/machine interface that are less attention-drawing given the lower danger of a penetration of the aircraft into a hazardous atmospheric area than of a collision with the terrain. Preferably, the calculated margins are also less strict than the margins of the terrain avoidance devices in order to avoid false alerts. The contours of the atmospheric areas that present a risk can in fact be approached with the main risk being bumping of the vessel and the comfort of the passengers being disturbed. The manoeuvre margins are less strict than with terrain-type obstacles.

The invention claimed is:

1. Method for a system for monitoring atmospheric areas presenting a risk for aircraft, the system being connected to a navigation system storing the trajectory of the aircraft, to a meteorological system, to alarm generation systems and to viewing devices, comprising the following steps:
   a. calculation of atmospheric areas detected by the meteorological system, the atmospheric areas being defined by different levels of risk, each level of risk being represented on an image by a specific color;
   b. calculation of at least one danger detection area in front of the aircraft defining an alert level, this area:
      i. being positioned on the current position of the aircraft, having a horizontal width widening laterally to the trajectory of the aircraft with distance in front of the aircraft; and
      ii. having a slope that varies dynamically in a manner similar to the current slope of the trajectory of the aircraft;
   c. generation of one or more alarms defining a level of risk and alert for the areas of intersection between the atmospheric areas and the danger detection area, each alarm being generated through an analysis of the image; and
   d. display of the intersection areas on all or part of the screen of at least one viewing device when an alarm is generated.

2. Method according to claim 1, wherein the meteorological system calculates the atmospheric areas in a three-dimensional space.

3. Method according to claim 2, wherein the danger detection area is a volume whose vertical thickness is approximately 300 m centered on the position of the aircraft.

4. Method according to claim 1, wherein the method calculates two detection areas positioned on the predicted trajectory of the aircraft, the first area beginning at the current position of the aircraft for a high alert level and the second area being positioned forward of the trajectory defining a lower alert level.

5. Method according to claim 1, wherein a danger detection area has an aperture angle, and within this angle the detection distance is constant.

6. Method according to claim 5, wherein the danger detection area is of trapezoidal shape, the lateral apertures having an angle of approximately 1.5 degrees relative to the heading of the aircraft at the start of the detection area.

7. Method according to claim 6, wherein, when the instantaneous flight trajectory of the aircraft includes a turn, the lateral aperture on the side of the turn widens proportionally and dynamically to the rate of turn.

8. Method according to claim 7, wherein the lateral aperture on the side opposite the turn diminishes proportionally and dynamically to the rate of turn.

9. Method according to claim 5, wherein the danger detection area has a sufficient length in front of the aircraft enabling the aircraft to perform a half-turn.

10. Method according to claim 1, wherein the danger detection area has an aperture angle, and inside this angle the detection distance is variable between a minimum value and a maximum value.

11. Method according to claim 10, wherein the detection distance varies symmetrically relative to the heading of the aircraft.

12. Method according to claim 1, wherein the levels of risk of the calculation of atmospheric areas further comprise the following factors:
   a. levels of reflectivity of radar emissions from cloud masses and to least one of:
      i. hydrometeor type variation; and
      ii. hydrometor velocity level.

* * * * *